July 26, 1955  C. F. TEICHMANN ET AL  2,714,116
HYDROCARBON SYNTHESIS WITH CATALYST OF LESS THAN ONE MICRON
Filed March 31, 1950
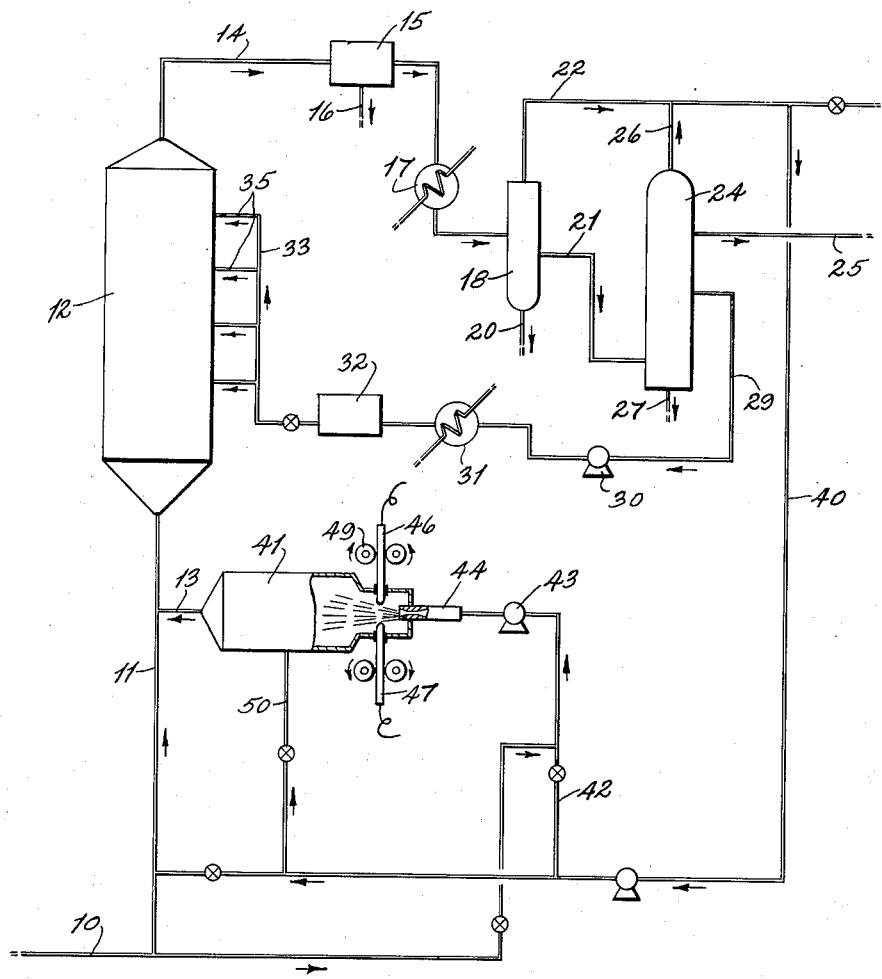
INVENTORS
CHARLES F. TEICHMANN
JAMES H. GRAHAME
BY
ATTORNEYS

United States Patent Office 2,714,116
Patented July 26, 1955

2,714,116

HYDROCARBON SYNTHESIS WITH CATALYST OF LESS THAN ONE MICRON

Charles F. Teichmann, Crestwood, and James H. Grahame, Mount Vernon, N. Y., assignors to Texaco Development Corporation, New York, N. Y., a corporation of Delaware Application March 31, 1950, Serial No. 153,246

11 Claims. (Cl. 260—449.6)

The present invention relates to the synthesis of hydrocarbons and more particularly, to the catalytic production of hydrocarbons by the direct conversion of a mixture of synthesis gas comprising hydrogen and carbon monoxide in the presence of an active synthesis catalyst in fine particle form.

The invention particularly contemplates effecting catalytic synthesis of hydrocarbons, as above, substantially exclusively by a solid catalyst having a particle size of the order of smoke particles which remain in suspension in gaseous atmosphere in any appreciable condition of movement. The particles are therefore relatively minute as contrasted with catalyst particles hitherto employed in previously proposed fixed or fluid bed contacting operations, wherein the reactants move relatively in contact with catalyst. In other words, the smoke catalyst of the present invention is composed essentially of particles in a size range too small to permit fluidization or fixed bed contact.

More specifically, it is contemplated employing contacting particles substantially less than five microns in diameter, that is, preferably less than about one micron in diameter. Actually, it is advantageous to restrict the catalyst essentially to particles not greater than a fraction of one micron in diameter, as for example, about 0.1 to 0.5 micron or finer.

As above indicated, at this range of particle size, the catalyst is incapable of use under prior methods of catalyst contact in that the particles are incapable of resisting transportation at any appreciable rate of gas flow, tending to immediate entrainment in the reactants, and thus passing out of the reaction zone with the reaction product effluent at essentially the same rate as the gas. They accordingly remain suspended indefinitely in the gaseous atmosphere under all practical conditions of gas flow, and are relatively resistant to separation by settling. Therefore, the desired reaction is effected simply by dispersing the catalytic smoke within the flowing stream of reactants, and directing it through a reaction zone under conditions of temperature and pressure at which the catalyst is active for the synthesis of hydrocarbons under sufficient residence time to effect substantial conversion of the reactants.

A major advantage of the present invention is the reduced overall consumption of catalyst in a continuous operating process. For example, a typical fluid hydrocarbon synthesis process using a fluidized, solid particle, iron catalyst and charging about 240 million cubic feet of synthesis gas a day, will consume about 6 tons of make-up catalyst per operating day. This means a current consumption of about one pound catalyst per 20,000 cubic feet of charge gas under settled operation, neglecting the substantial catalyst losses, due to discharging the contents of the reactor at the termination of an operating run.

The present invention, however, in addition to obviating the problem of catalyst fluidization, enables conversion of an equivalent amount of reactants by means of a substantially decreased amount of catalyst in the form of smoke particles. For example, with a smoke type catalyst, in accordance with the present invention, the catalyst consumption does not amount to more than one pound per 30,000 cubic feet of charge gas, and may be substantially less. Therefore, there is a substantial saving in catalyst requirement, due, presumably, to the surprisingly high activity of the minute smoke particles and the effective contact which occurs resulting from their wide dispersion throughout the reactant gas mixture.

In addition, the invention, as above intimated, obviates the problems associated with dense fluid bed contact. While certain important advantages of fluid catalyst synthesis, relative to prior methods of contact, are well known, nevertheless certain disadvantages are incurred as the result of this type of operation. Among these are the technical difficulty of maintaining uniform fluidization, particularly under desired operating conditions, the detrimental effect upon the fluid catalyst mass of physical changes which inevitably occur in the catalyst particles during operation, the catalyst treatment and transportation problems which arise, and the resulting high investment cost in equipment.

The smoke phase of fine, essentially dust-like particles is not appreciably affected by operating conditions or by physical changes in the catalyst, and involves no problem of catalyst regeneration or handling.

In accordance with the present invention, the smoke phase of catalyst is prepared by distending a fluent, that is, a molten or vaporized catalytic material in a stream of expanding gas effective to atomize the fluent catalyst and thereafter cause rapid cooling to form solid, discrete, non-settling particles, in the range preferably below about one micron in diameter.

The catalytic materials contemplated involve those effective for the direct catalytic conversion of hydrogen and carbon monoxide into hydrocarbons such, for example, as iron, nickel, cobalt, ruthenium and the like.

Atomization to form the smoke-like phase may be practiced in a number of ways. For example, the catalytic material in the form of a powder, a strip or even a massive shape, is heated to a high temperature at which it melts or preferably vaporizes and is readily blown out or distended upon an expanding jet of gas. Thus, for example, the solid catalyst may be progressively fed into a high temperature flame maintained above the melting point, from which the molten or vaporform residue is ejected or blasted by the impelling jet.

It is particularly advantageous, however, to effect vaporization of the catalyst by means of an electric arc, into or about which the gaseous jet passes to remove the catalyst vapors as they are formed. In general, it is to be noted that a phenomenal cooling effect occurs in this type of operation, whereby the jetted stream of atomized material, only a relatively short distance from the point of vaporization or melting, is sharply lowered in temperature so that the particles rapidly return to their normally solid phase condition, and, as minute particles, flow freely with the enveloping stream of gases to the point of injection and dispersion within the main stream of synthesis reactants.

In accordance with the present invention, it is particularly contemplated employing a relatively spreading jet of projecting or atomizing gas, moving at a substantial rate, effective to cause the desired high extent of catalyst dispersion and atomization whereby the final particles are essentially in the size range not greater than about one micron in diameter, preferably in the range of 0.1 to 0.5 micron and smaller. To this end, projection rates of the gas jet desirably approach and exceed the speed of sound, in any event, exceeding 300 meters per second.

The projecting stream of gas may be selected from a wide field of alternatives, including gases substantially inert to the catalyst and the reactants, as well as gases which have a substantial oxidizing or reducing influence upon the catalyst. Actually, regulation of the gas as regards its oxidizing and reducing effect is frequently of advantage in conditioning the catalytic atmosphere to an ideal state of reactivity. For example, in a condition of ideal activity, the catalyst appears to comprise a complex association of oxide, carbide, and possibly pure metal. Usually, such a composition is reached as a result of the conditioning effect of contact with a reactant mixture. Actually, in the extreme case of subdivision contemplated by the present invention, catalyst conditioning is extremely rapid, or almost instantaneous. However, regulation of the atmosphere of smoke formation may manifestly further this effect.

For example, in forming a smoke phase, as above, from metallic iron, air or even pure oxygen may advantageously be included to effect partial oxidation of the final product. Similarly, if a highly oxidic iron is employed as the starting material for creating the smoke phase, a somewhat reducing atmosphere is desirable, to assure the desired partial oxidation of the product.

Examples of suitable oxidizing gases are air, steam, carbon dioxide and the like, while hydrogen and light hydrocarbon gases illustrate the reducing gases. The substantially inert gases such as nitrogen and the rare gases may advantageously be admixed with any of the foregoing as desirable diluents.

Preferably, however, the atomizing gas stream injected to form the smoke phase comprises recycle gas from the hydrocarbon synthesis step to which may be added small quantities of synthesis gas. In this manner, the smoke phase particles tend toward an equilibrium with the atmosphere in which they form such that their composition approximates that of an active synthesis catalyst during the synthesis of hydrocarbons. In short, such catalyst atomization inherently involves conditioning of the product for maximum catalytic activity in the reaction zone.

In the finely divided form, the phase of smoke and entraining gas readily forms a uniform intermixture with a reactant feed of synthesis gas when injected into a moving stream thereof. Any suitable expedient for mixing may be employed, although as above intimated, only moderate turbulence is sufficient.

With the reactants at reaction temperature, conversion immedaitely commences and proceeds rapidly. Temperature regulation of the reaction mixture is readily controllable within the desired narrow range by various means, as for example, cooling or heat exchange surfaces in the reaction zone subject to temperature regulation by suitable internal coolant. Alternatively, the injection of a suitable vaporizable liquid fraction, such as water or a liquid hydrocarbon fraction can be effected in regulated amount to produce the same effect.

The finely divided smoke phase is removable from the effluent product stream only by extraordinary means, such as electrostatic precipitators, and even under such conditions may be relatively difficultly removable. However, any residual smoke particles tend to be separated in the liquid product condensate and ultimately separate into the bottoms or heavier fractions with which they are not, in small quantity, objectionable.

In order to describe the invention in detail, reference is had to the attached flow sheet representing one embodiment of the present invention, wherein a synthesis feed gas from any suitable source, not shown, enters through pipe 10 and branch pipe 11, being mixed therein with a smoke phase of catalyst prepared as hereinafter described in branch pipe 13, and thereafter entering reaction chamber 12.

The synthesis gas feed in pipe 10 preferably comprises hydrogen and carbon monoxide in the molar ratio of about 2:1, usually in the range from about 1.5:1 to about 2.2:1, although the process is applicable to feeds of widely varying hydrogen and carbon monoxide composition, as suitable, down to 0.5:1 to 1:1, or even below.

In reactor 12, substantial conversion of the reactants takes place into hydrocarbons and the like, and the reaction products subsequently are withdrawn through pipe 14 into electrostatic precipitator 15, where colloidal smoke particles are removed and discarded as at 16.

The residual product gas stream passes through condenser 17 into separator 18, in which the normally liquid fractions condense, yielding a by-product aqueous condensate, withdrawn as at 20, a product oil or hydrocarbon layer recovered by pipe 21, and an overhead, normally gaseous fraction removed overhead as at 22.

The recovered oil passes into a fractionation system, more or less diagrammatically represented at 24, from which desired products in the gasoline boiling range are taken off at side arm 25, while the gaseous fractions pass overhead as at 26, into the aforementioed pipe 22. Any heavy fractions are recovered as indicated through pipe 27, for further treatment or use not shown.

A suitable side stream of liquid, vaporizable under the conditions of temperature and pressure within the reactor 12, taken off the fractionation system as at 29, passes through pipe 30 and heat exchanger 31 into an accumulator vessel 32. Vessel 32, in turn, supplies header 33, feeding several side injectors 35, disposed in spaced vertical relationship along the side of the reactor. The coolant liquid is injected into the reactor, preferably in the form of an atomized mixture of vapor and droplets under an elevated temperature and pressure such that they tend to vaporize immediately and completely, and thereby dissipate latent heat of vaporization of the injected liquid to regulate temperature in the reactor. Manifestly, at a regulated rate of addition, the vaporizable liquid will be effective to hold the interior of the reaction zone 12 at the desired reaction temperature, as, for example, about 650° F.

Referring to the effluent normally gaseous stream in pipe 22, a portion thereof may be vented, the remainder passing through branch recycle line 40 leading to inlet pipe 11 of reaction zone 12.

Continuous formation of the smoke catalyst phase is effected in a generator 41 within which vaporform metallic iron is distended on an expanding jet stream of recycle gas. To this end, a portion of the gas stream in pipe 40 is branched off as at 42, and passed through a compressor 43 feeding nozzle 44, which injects into the extremity of the generator 41. Oppositely disposed rods or wires 46 and 47 of iron, for example, project through suitable packing means into the interior of the vessel 41 to form electrodes whose inner extremities provide a gap approximately opposite the extremity of the nozzle 44. The two electrodes are, as indicated, connected with a source of electrical energy effective to maintain a high current flow rate to support an arc between the electrodes together at a rate equal to their consumption, as the result of vaporization and melting by the arc. In other words, the length of the arc is maintained approximately constant between the inner extremities of the electrodes.

The jet of recycle gas issuing from nozzle 44 passes through at least a portion of the arc. Advantageously, it is directed to avoid the central portion of the arc and sweep the outer portions comprising the vaporized metal. As a result, the iron vaporized in the arc is continuously projected outwardly in the expanding stream of jet recycled gas, as above indicated, to result in the minute particle subdivision essential to form the desired smoke phase.

As above indicated, the gaseous smoke phase continuously moves through pipe 13 into the incoming reactants. With a smoke phase composed essentially of particles less than one micron upwardly of 20,000–30,000 standard cubic feet of synthesis gas is convertible into hydrocarbons, predominantly boiling in a normally liquid range, per pound of iron consumed at the electrodes 46 and 47.

As previously intimated, it is frequently advantageous to include a small proportion of the fresh synthesis gas in the atomizing stream to the smoke generator. To this end, pipe 10 is extended to merge with pipe 42 in advance of the compressor 43 so that controlled amounts of fresh feed may admix with the recycle gas.

Additional entraining gas may be injected into the smoke generator from recycle line 40, via branch pipe 50. Advantageously, when a gas of substantial oxidizing character is supplied at the nozzle 44, it is advisable to introduce into the region of the issuing jet, by means not shown, a stream of methane or other combustible gas to consume any residual traces of oxygen.

While the foregoing illustrative embodiment is presented in terms of employing an iron synthesis catalyst to produce normally liquid hydrocarbon fractions, the invention is not so limited, but contemplates any operating combination of temperatures, pressures and synthesis catalyst capable of yielding a predetermined or desired fraction of hydrocarbons or oxygenated hydrocarbons. With an iron type catalyst, substantial activity for the synthesis of hydrocarbons occurs normally at superatmospheric, usually above 100 p. s. i., and preferably 150–500 p. s. i., with temperatures in the range of from about 500 to 750° F.

For the production of normally liquid fractions, a temperature in the range of about 550–700° F. and a pressure of 200 to 400 p. s. i. are required.

It is to be understood, however, that with other catalytic materials the operating temperature and pressure will vary according to the characteristics of the specific catalyst. For example, with cobalt, reaction temperature is usually in the range from about 350–450° F., preferably at atmospheric pressure.

As regards generation of the smoke-like catalyst phase, it has been shown above that the preferred electric arc system of vaporization may be substituted by a high temperature flame, as for example, an acetylene oxygen flame, into which a wire or strip of catalytic material is fed, and from which the molten or vaporform products are projected preferably by an annular surrounding jet of atomizing gas.

Where high pressure operation is involved, it is preferred to jacket the feeding mechanism within a pressurized chamber, not shown. In general, the specific details of any such pressurized mechanism for forming and atomizing the molten or vaporform metal constitutes, per se, no part of the present invention, is understood to those skilled in the art of high pressure processing, and is therefore not shown in detail.

The same is true of details of arc maintenance and metal feeding. For example, as regards the preferred arc generation of catalytic smoke, it is preferred to provide for continuous reforming of the arc in spite of any disrupting influence of the gas jet. This may be accomplished by supplying the electrodes with a source of electrical energy comprising a high frequency current superimposed upon an alternating arc current, as described in "Metal Spraying and Sprayed Metal," by Ballard, 1948, Griffin & Co., Ltd., page 167. In this way, extinguishment of the arc by the projecting jet is prevented, whereby the process operates continuously.

It is contemplated, moreover, that the interior of the generator be of such size that the high velocity of the projected particles is essentially dissipated before contact of any of the particles with the walls. In this way, any particles reaching the wall do so at a sufficiently low velocity and temperature to avoid any tendency to adhere to or coat the walls of the generator. Similarly, it is preferred to employ a projecting jet 44 having a substantial angle of spread, for example, about 10°, such that a relatively wide distension and direction of the sprayed metal takes place, favoring the formation of particles of the minimium practical dimension.

As previously indicated, good temperature control of the reaction zone 12, is realizable by means of indirect cooling exchangers in spite of prior inability to realize such a result in the absence of a dense fluid phase of solid particles about the exchanger. The new result is thought to be due to the more moderate and uniform rate of reaction throughout the length of the reaction zone. In other words, the widely dispersed, microscopic particles overcome the instantaneous reaction and inordinate release of heat which occurs at the inlet of the typical fluid or fixed bed reaction zone by greatly moderating reaction at this point and distributing it more uniformly throughout the reactor.

Other forms of temperature regulation, however, are contemplated; as for example, passage of the mixture through a mass of fluidized, inert, solid particles, such as sand, silica, graphite, copper or the like, immersed in a cooling exchanger. In this way, the characteristically good thermal transfer of a fluidized system is realized, without the disadvantages of particle decrepitation and loss of fluid bed, otherwise encountered where the dense fluid phase of particles is composed of an active catalyst.

Obviously, many modifications and variations of the invention, as hereinbefore set forth, may be made without departing from the spirit and scope thereof, and therefore, only such limitations should be imposed as are indicated in the appended claims.

We claim:

1. In the catalytic synthesis of hydrocarbons by contacting synthesis gas comprising hydrogen and carbon monoxide with a catalytic material to form a product mixture comprising desired hydrocarbons together with a normally gaseous effluent product fraction, the steps which comprise subjecting a material of the class consisting of metals of the iron group and ruthenium to a temperature above its melting point to convert said catalytic metal to a fluid, distending the fluid metal in a high velocity stream of expanding gas comprising said normally gaseous effluent product fraction, thereby providing a catalyst conditioning atmosphere, effecting the said distention of the fluid metal by projecting said expanding gas stream at the fluid metal at a rate sufficient to atomize the fluid into particles less than 1 micron in diameter and thereafter cause rapid cooling thereof to form a smoke phase composed essentially of active catalytic particles less than about one micron in diameter, mixing said smoke phase with synthesis gas at a temperature and pressure at which the catalyst is effective to convert substantial proportions of synthesis gas into said desired hydrocarbons, and recovering the desired product hydrocarbons.

2. The method according to claim 1, wherein said smoke phase of the catalyst is composed predominantly of particles in the range of 0.1 to 0.5 micron in diameter.

3. The method of claim 1, wherein the smoke phase of catalyst is mixed with the reactants in the proportion of not greater than about one pound of catalyst per 20,000 cubic feet of hydrogen and carbon monoxide.

4. The method of claim 1, wherein the smoke phase of catalyst is mixed with the reactants in the proportion of not greater than about one pound of catalyst per 30,000 cubic feet of hydrogen and carbon monoxide.

5. The method according to claim 1, wherein said smoke phase of catalyst is formed by atomizing said catalyst in the form of a vapor.

6. The method according to claim 1 wherein said high velocity stream of expanding gas is contacted with said fluid catalyst at a projection rate exceeding about 300 meters per second.

7. The method according to claim 1 wherein said high velocity stream of expanding gas comprises synthesis gas.

8. The method according to claim 1 wherein said smoke phase is contacted with said synthesis gas at a temperature regulated by the controlled injection into the reaction mixture of hydrocarbon liquid vaporizable under the conditions of temperature and pressure therein.

9. In the synthesis of hydrocarbons wherein a synthesis gas comprising hydrogen and carbon monoxide is contacted with a catalyst effective to convert said synthesis gas into desired hydrocarbon fractions, the steps which comprise subjecting a material of the class consisting of the metals of the iron group, and ruthenium to a temperature above its melting point to form a fluid phase, subjecting said fluid material to a jet of expanding gas comprising the normally gaseous effluent product fraction of the said hydrocarbon synthesis at a projection rate sufficient to atomize the fluid material into particles substantially less than 1 micron in diameter, thereby forming a smoke phase of said particles, mixing said smoke phase with said synthesis gas, subjecting said mixture to an elevated temperature and pressure sufficient to effect substantial conversion of said reactants into desired hydrocarbons, withdrawing said reaction products and recovering therefrom said normally gaseous effluent product fraction for atomizing said fluid material as aforesaid.

10. The method according to claim 9, wherein said catalytic material is atomized from the vapor state.

11. The method according to claim 9, wherein the catalyst is subjected to said temperature above its melting point by means of an electric arc.

References Cited in the file of this patent

UNITED STATES PATENTS

| | | |
|---|---|---|
| 2,364,145 | Huppke et al. | Dec. 5, 1944 |
| 2,365,720 | Neighbors | Dec. 26, 1944 |
| 2,399,540 | Carr | Apr. 30, 1946 |
| 2,464,505 | Hemminger | Mar. 15, 1949 |
| 2,465,462 | Layng | Mar. 29, 1949 |
| 2,486,894 | Watson | Nov. 1, 1949 |